United States Patent
Wasserman et al.

(10) Patent No.: US 6,568,354 B1
(45) Date of Patent: May 27, 2003

(54) PET IDENTIFICATION TAG WITH ELECTRONIC DISPLAY

(76) Inventors: Dennis J. Wasserman, 331 Avenida de los Royale, Thousand Oaks, CA (US) 91362; Jeffrey J. Kolodziej, 935 Weber Cir., Apt. 108, Ventura, CA (US) 93001

( * ) Notice: Subject to any disclaimer, the term of this patent is extended or adjusted under 35 U.S.C. 154(b) by 0 days.

(21) Appl. No.: 10/068,502

(22) Filed: Feb. 5, 2002

(51) Int. Cl.⁷ ............................................. A62B 35/00
(52) U.S. Cl. ........................ 119/859; 119/858; 40/303
(58) Field of Search ........................... 119/859; 40/303, 40/300, 301; 220/4.24, 784

(56) References Cited

U.S. PATENT DOCUMENTS

| | | | |
|---|---|---|---|
| 361,757 A | * 4/1887 | Merino et al. .................. 76/42 |
| 3,292,840 A | * 12/1966 | Schmidt ...................... 206/776 |
| 4,049,357 A | * 9/1977 | Hamisch, Jr. ................. 16/444 |
| 4,741,434 A | * 5/1988 | Liebman ...................... 206/38 |
| 4,980,679 A | 12/1990 | Klaubert |
| 5,012,229 A | * 4/1991 | Lennon et al. .................. 221/2 |
| 5,036,610 A | 8/1991 | Fehr |
| 5,172,348 A | * 12/1992 | Paratte ........................ 368/47 |
| 5,337,041 A | * 8/1994 | Friedman ..................... 340/539 |
| 5,355,839 A | * 10/1994 | Mistry ......................... 119/858 |
| 5,454,350 A | * 10/1995 | Betheil ........................ 119/858 |
| 5,473,337 A | 12/1995 | Berger |
| 5,530,235 A | 6/1996 | Stefik |
| 5,691,932 A | * 11/1997 | Reiner et al. ............ 340/309.4 |
| 5,752,335 A | 5/1998 | Shimogori et al. |
| 5,789,732 A | 8/1998 | McMahon et al. |
| 5,797,511 A | * 8/1998 | Elsdon et al. ................ 215/245 |
| 5,878,116 A | 3/1999 | Scott |
| 5,912,956 A | 6/1999 | Longo et al. |
| 5,943,302 A | * 8/1999 | Fanshaw ..................... 368/276 |
| 5,955,953 A | 9/1999 | Hanson |
| 6,003,473 A | 12/1999 | Printz |
| 6,064,307 A | 5/2000 | Silver |
| 6,067,018 A | * 5/2000 | Skelton et al. .............. 119/721 |
| 6,070,749 A | * 6/2000 | Joulia ......................... 132/294 |
| 6,329,918 B1 | * 12/2001 | Moyer ........................ 119/859 |

FOREIGN PATENT DOCUMENTS

DE 3610960 A1 * 10/1987 ................. 119/859

* cited by examiner

Primary Examiner—Peter M. Poon
Assistant Examiner—Joan M. Olszewski
(74) Attorney, Agent, or Firm—Jack C. Munro

(57) ABSTRACT

A pet identification tag with an electronic display which would display pet owner identification information when activated. Also, pertinent information for the pet can be displayed. The pet identification tag is small in size and readily mountable on an exterior structure, such as a dog or cat collar.

9 Claims, 2 Drawing Sheets

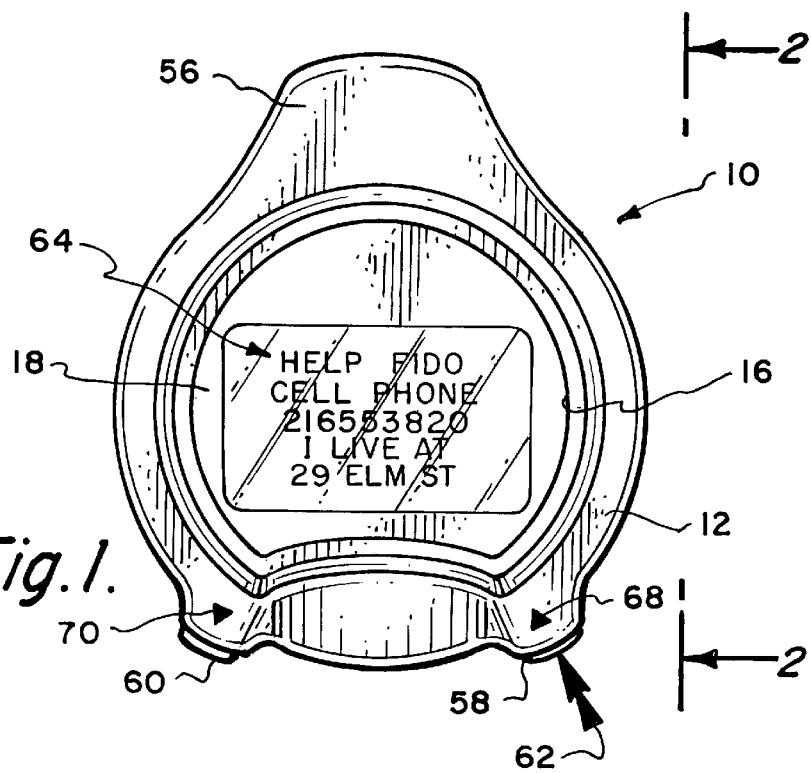
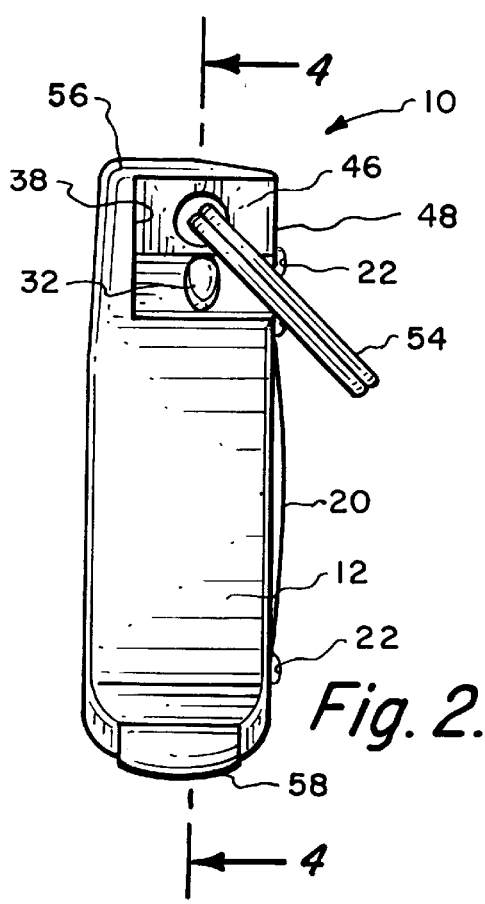
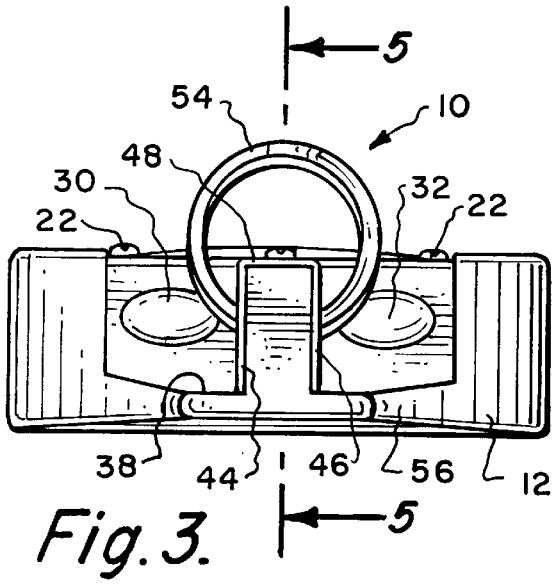

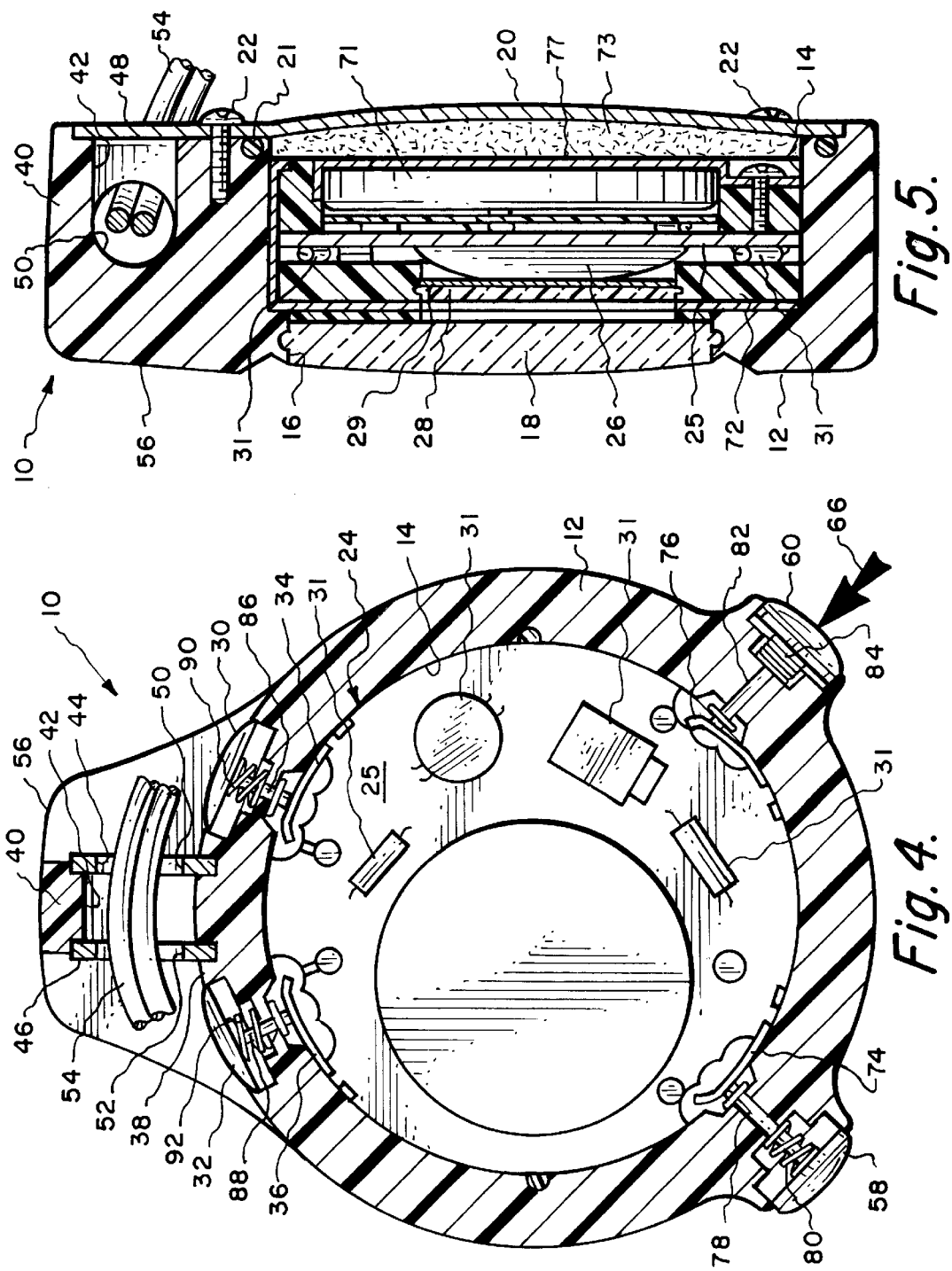

PET IDENTIFICATION TAG WITH ELECTRONIC DISPLAY

BACKGROUND OF THE INVENTION

1. Field of the Invention

The present invention relates to a pet identification tag and more particularly to a pet identification tag which electronically displays pertinent information about the pet to a human individual that desires to receive this information.

2. Description of the Related Art

Owners of pets are always faced with the possibility of losing their pet. In an attempt to assure safe return of a pet, in the past, owners have placed the name of the pet and a phone number on a metallic or plastic tag that is to be worn by the pet in hopes that the finder of the lost pet will contact the owner if the pet is found. However, using of such a metal tag only permits the application of a limited amount of information, such as the pet's name and the phone number of the owner. It would be desirable to include on the identification tag additional information, such as the address of where the pet lives, possibly a cell phone and or business numbers, an e-mail address and even possibly unique medical information about the pet that requires the pet frequently consume a medicine. It would also be desirable to include on the pet identification special dietary information required by the pet.

The engraved information on the metal tag has a tendency to wear and become unreadable. The engraved information on plastic tags also has a tendency to wear which makes such unreadable.

Another disadvantage of prior art metal and plastic identification tags is that there is no way to change the information on the tag. If an owner moves to a new house which has a new phone number, it is necessary that the owner purchase a new tag and replace the old tag with the new tag. What is a common occurrence is that the owner neglects to obtain a new tag for the pet which means that if the pet becomes lost, the person finding the pet is not able to locate the owner because of inaccurate information. It would be desirable to provide a pet identification tag that could be reprogrammable by the owner eliminating a need to purchase an additional tag.

SUMMARY OF THE INVENTION

A basic embodiment of pet identification tag with electronic display which utilizes a rigid housing which has an internal chamber with an electronic chip being mounted within that internal chamber. The electronic chip has information recorded thereon which is to be recorded by the owner of the pet. That electronic information is to be displayed in any one of several different languages on a scrollable screen. A window is mounted in the rigid housing with the window permitting viewing of the scrollable screen. The housing has a baseplate fixedly mounted on the housing which is designed to enclose the internal chamber. The housing has a recess area with the recess area having a protruding tab. The protruding tab has a first connecting means. The baseplate has an extension with the extension being located against the protruding tab. The extension has a second connecting means. Both the first connecting means and the second connecting means are to connect with an attachment which is used to attach the tag to an exterior structure mounted on a pet.

A further embodiment of the present invention is where the basic embodiment is modified by the first connecting means comprising a cavity.

A further embodiment of the present invention is where the just previous embodiment is modified by the second connecting means comprising at least one hole.

A further embodiment of the present invention is where the just previous embodiment is modified by the attachment including a ring.

A further embodiment of the present invention is where the basic embodiment is modified by including of a programming button within the recess area of the housing.

A further embodiment of the present invention is where the basic embodiment is modified by mounting of a pair of scroll buttons on the housing with these scroll buttons being mounted on the portion of the housing located opposite from the recess area and thereby readily accessible by any individual holding of the pet identification tag.

A further embodiment of the present invention is where the basic embodiment is modified by the electronic chip requiring a pin number when programming of the chip eliminating any unauthorized programming of the chip;

A further embodiment of the present invention is where the basic embodiment is modified by the electronic chip having a back light to illuminate the scrollable screen.

BRIEF DESCRIPTION OF THE DRAWINGS

For a better understanding of the present invention, reference is to be made to the accompanying drawings. It is to be understood that the present invention is not limited to the precise arrangement shown in the drawings.

FIG. 1 is an exterior front view of the pet identification tag with electronic display of this invention clearly showing the information being displayed on a scrollable screen which is located interior of and directly adjacent to a transparent window;

FIG. 2 is a right side view of the pet identification tag with electronic display of this invention taken along line 2—2 of FIG. 1;

FIG. 3 is a top plan view of the pet identification tag with electronic display of this invention;

FIG. 4 is a longitudinal cross-sectional view through the pet identification tag with electronic display of this invention taken along line 4—4 of FIG. 2; and FIG. 5 is a longitudinal cross-sectional view through the pet identification tag with electronic display of this invention taken along line 5—5 of FIG. 3.

DETAILED DESCRIPTION OF THE INVENTION

Referring particularly to the drawings, there is shown the pet identification tag with electronic display 10 of this invention. The tag 10 has a small sized, basically disc shaped, housing 12. The housing 12 will normally be constructed of a plastic material. However, it is altogether possible that other rigid materials could be utilized, such as metal. The housing 12 has an internal chamber 14. Formed within the front surface of the housing 12 is an enlarged opening 16. Mounted within the enlarged opening 16 is a transparent window 18. Normally, the window 18 will be constructed of acrylic plastic. However, it is considered to be within the scope of this invention that the window 18 could be constructed of glass. The side of the internal chamber 14 that is located opposite the window 18 is basically open with the exception that this open end of the internal chamber 14 is designed to be closed by the mounting of a baseplate 20 on the housing 12. An O-ring seal 21 forms a watertight seal between the baseplate 20 and the housing 12. Normally, the baseplate 20 will be constructed of a metallic material. The use of a metallic material is for strength purposes. However, it is considered to be within the scope of this invention that the baseplate 20 could also be constructed of a plastic material. The baseplate 20 is fixedly mounted to the housing 12 by means of a plurality of screw or bolt fasteners 22.

Mounted within the internal chamber 14 is an electronic chip 26. The electronic chip 26 is a product that is manufactured to certain specific requirements for this pet identification tag 10. The electronic chip 26 is manufacturable by numerous different manufacturers. Associated with the electronic chip 26 is an electronically scrollable screen 29 which is covered by a separate transparent window 28. The scrollable screen 29 is to be observable by a human through windows 18 and 28. The electronic chip 26 is operated by battery 71. The scrollable screen 29 is mounted on a printed circuit board 25 which also has electronic components 31 mounted thereon. The electronic chip 26 is to be programmable with certain information by depressing of programming buttons 30 and 32. A programming manual is to be included in conjunction with the identification tag of this invention to guide the user into how to use the programming buttons 30 and 32 and scroll buttons 58 and 60 in order to record the desired information within the electronic chip 26 which will be displayed on the scrollable screen 29. In order to program the chip 26, the user may program in a PIN number. The PIN number will insure that only the authorized individual is performing the programming. Next, the user must select what language the information 64 is to be displayed. The typical languages would be English, French, Spanish, Italian and German. Normally, the desirable electronic information includes the pet's name, the phone numbers of the owner, the address of the owner and also other pertinent information such as specific medical requirements of the pet and also possible specific dietary requirements of the pet. Programming button 30, when pressed, acts against a switch arm 34 of the electronic chip 26. Pressing of the programming button 32 causes depressing of a switch arm 36 of the electronic chip 26. Pressing of either button 58 or 60 will activate the tag 10 and illuminate the scrollable screen 29 by a back light 72. A resilient (soft) insulation 73 is located between battery mount 77 and baseplate 20 which protects the chip 26 against physical shock.

The housing 12 includes a recess area 38. The recess area 38 has formed therein a protruding tab 40. The protruding tab 40 includes a cavity 42. The baseplate 20 has a bifurcated extension in the form of a pair of spaced-apart plates 44 and 46. The plates 44 and 46 are connected together by an apex plate 48. The apex plate 48 is located flush with the baseplate 20. Formed within the plate 44 is a hole 50. Formed within the plate 46 is a hole 52. The holes 50 and 52 connect with the cavity 42. The apex plate 48 is to be mounted against the protruding tab 40 essentially closing of the cavity 42. An attachment in the form of a split ring 54 is to be passed through the holes 50 and 52 and through the cavity 42. The split ring 54 is to be used to mount the pet identification tag of this invention on an exterior structure, such as a pet collar.

It is to be understood that the programming buttons 30 and 32 are located within the confines of the recess area 38. Because of the raised front section 56 of the housing 12 and the location of the split ring 54, it would be difficult for a human to accidently press the programming buttons 30 and 32 which could affect the programmed information on the scrollable screen 29. A human user must make a specific effort to press and hold either of the program buttons 30 and 32 thereby hopefully eliminating inadvertent contact of the buttons 30 and 32 by their location.

Button 58 is an up scroll button 58 and button 60 is a down scroll button. Pressing of the up scroll button 58 in the direction of arrow 62 will cause the information 64 on the scrollable screen 29 to be scrolled in an upward direction, that is toward the raised front section 56. That means that the information 64 physically moves in the direction of the raised front section 56. When a user presses the down scroll button 60 in the direction of arrow 66, the information 64 will be moved toward the lower end of the housing 12 toward the scroll buttons 58 and 60. It is to be noted that the scroll buttons 58 and 60 are located on the housing 12 essentially opposite the recessed area 38. The scroll buttons 58 and 60 are to be readily accessible and usable by any individual, such as a individual that finds a lost pet. The position of the scroll buttons 58 and 60 and their respective up indicator 68 and down indicator 70 is to provide clear operating characteristic to any human being even if the human has never seen the pet identification tag of this invention. The information 64 is not displayed until a human either presses button 58 or 60 at which time the information will be displayed and a back light 72, included within the electronic chip 26, will cause illumination of the scrollable screen 29. The function of the back light 72 is to illuminate the information 64 to make it easily readable even in a darkened environment.

The scroll button 58 operates against a switch arm 74 of the electronic chip 26. The scroll button 60 operates against a switch arm 76 of the electronic chip 26. The scroll button 58 has mounted thereon a shaft 78 which presses against the switch arm 74. Surrounding a portion of the shaft 78 and extending between the housing 12 and the button 58 is a coil spring 80. The coil spring 80 functions to exert a continuous bias tending to locate the button 58 in its outward inactivated position. The button 60 also has a similar shaft 82 and a similar coil spring 84. It is to be noted also that programming buttons 30 and 32 have respectively similar shafts 86 and 88 and similar coil springs 90 and 92.

What is claimed is:

1. A pet identification tag with electronic display comprising:

a rigid housing having an internal chamber;

an electronic chip being mounted within said internal chamber, said electronic chip having information recorded thereon which is pertinent to a specific pet, said electronic chip connecting with a scrollable screen which is to display the information;

a window mounted in said rigid housing, said window permitting viewing of said scrollable screen;

said housing having a baseplate fixedly mounted on said housing which is designed to enclose said internal chamber and be removable from said housing to gain access to said electronic chip and said scrollable screen; and said housing having a recess area which is spaced from said internal chamber, said recess area having a protruding tab, said protruding tab having first connecting means, said baseplate having an extension, said extension being located against said protruding tab, said extension having second connecting means, both said first connecting means and said second connecting means to connect with an attachment which is used to attach said tag to an exterior structure mounted on a pet.

2. The pet identification tag with electronic display as defined in claim 1 wherein:

said first connecting means comprising a cavity.

3. The pet identification tag with electronic display as defined in claim 2 wherein:

said second connecting means comprising at least one hole, said hole connecting with said cavity.

4. The pet identification tag with electronic display as defined in claim 3 wherein:

said attachment comprising a ring, said ring being conducted through said cavity and said hole.

5. The pet identification tag with electronic display as defined in claim 1 wherein:

said recess area having at least one programming button, locating of said programming button in said recess area makes it difficult to inadvertently contact said programming button.

6. The pet identification tag with electronic display as defined in claim 1 wherein:

a pair of scroll buttons being mounted on said housing, said scroll buttons being located on a portion of said housing oppositely located from said recess area.

7. The pet identification tag with electronic display as defined in claim 1 wherein:

said electronic chip requiring a pin number to be used when programming of said chip eliminating unauthorized programming of said chip.

8. The pet identification tag with electronic display as defined in claim 1 wherein:

said electronic chip to be programmed to display said information in any one of a multitude of languages.

9. The pet identification tag with electronic display as defined in claim 1 wherein:

said electronic chip having a back light to illuminate said scrollable screen.

* * * * *